(12) United States Patent
Van Ginkel et al.

(10) Patent No.: US 7,908,130 B2
(45) Date of Patent: Mar. 15, 2011

(54) MODELLING AGGREGATE TRANSPORT LAYER NETWORK TRAFFIC BEHAVIOUR WITH FEEDBACK CONTAINING PACKET LOSS INFORMATION

(75) Inventors: Darren Van Ginkel, Wheelers Hill (AU); Marian Bejan, Don Valley (AU)

(73) Assignee: Ixia, Calabasas, CA (US)

( * ) Notice: Subject to any disclaimer, the term of this patent is extended or adjusted under 35 U.S.C. 154(b) by 799 days.

(21) Appl. No.: 10/317,312

(22) Filed: Dec. 12, 2002

(65) Prior Publication Data

US 2004/0117474 A1    Jun. 17, 2004

(51) Int. Cl.
G06F 17/50    (2006.01)
G06F 7/50    (2006.01)
G06F 11/00    (2006.01)
G06F 15/173    (2006.01)

(52) U.S. Cl. ........ 703/13; 370/236.1; 709/224; 709/226

(58) Field of Classification Search ............. 370/254, 370/401, 236.1; 703/21, 13; 709/223, 224, 709/226
See application file for complete search history.

(56) References Cited

U.S. PATENT DOCUMENTS

| | | | | |
|---|---|---|---|---|
| 5,991,265 A * | 11/1999 | Lincoln | ............... | 370/236.1 |
| 6,011,777 A * | 1/2000 | Kunzinger | ............... | 370/236.1 |
| 6,252,891 B1 * | 6/2001 | Perches | ............... | 370/503 |
| 6,314,531 B1 | 11/2001 | Kram | | |
| 6,414,939 B1 * | 7/2002 | Yamato | ............... | 370/236.1 |
| 6,529,475 B1 * | 3/2003 | Wan et al. | ............... | 370/231 |
| 6,535,487 B1 * | 3/2003 | Biswas et al. | ............... | 370/236.1 |
| 6,549,517 B1 * | 4/2003 | Aweya et al. | ............... | 370/236.1 |
| 6,691,167 B2 * | 2/2004 | Procopio et al. | ............... | 709/235 |
| 6,785,238 B1 * | 8/2004 | Kago | ............... | 370/236.1 |
| 7,039,712 B2 * | 5/2006 | Valavi et al. | ............... | 709/228 |
| 7,468,947 B2 * | 12/2008 | Mannal et al. | ............... | 370/236 |
| 7,783,463 B2 * | 8/2010 | Herro | ............... | 703/13 |
| 2002/0085502 A1 * | 7/2002 | Chheda et al. | ............... | 370/252 |
| 2004/0190449 A1 * | 9/2004 | Mannal et al. | ............... | 370/229 |
| 2004/0190606 A1 * | 9/2004 | Deshpande | ............... | 375/240.01 |
| 2007/0133441 A1 * | 6/2007 | Kang et al. | ............... | 370/282 |
| 2007/0165531 A1 * | 7/2007 | Labrador et al. | ............... | 370/235 |
| 2009/0168720 A1 * | 7/2009 | Vinayakray-Jani et al. | .. | 370/331 |

(Continued)

FOREIGN PATENT DOCUMENTS

JP    2000049863 A    *    2/2000

(Continued)

OTHER PUBLICATIONS

Fall, Kevin and Sally Floyd. "Simulation-based Comparisons of Tahoe, Reno, and SACK TCP." Jan. 7, 1998. Lawrence Berkely National Laboratory.*

(Continued)

*Primary Examiner* — Kamini S Shah
*Assistant Examiner* — Akash Saxena
(74) *Attorney, Agent, or Firm* — Jenkins, Wilson, Taylor & Hunt, P.A.

(57) ABSTRACT

A method of modelling network traffic behavior comprises transmitting network traffic through a communications network at a transmission rate and receiving at a traffic receiver the network traffic from the communications network. Feedback data is then derived from the network traffic received by the traffic receiver and used to generate instructions for altering the network traffic transmission rate. The network traffic is then transmitted through the network at the altered transmission rate according to the instructions.

23 Claims, 2 Drawing Sheets

U.S. PATENT DOCUMENTS

2010/0008305 A1* 1/2010 Yeo et al. .................. 370/329
2010/0299433 A1* 11/2010 De Boer et al. .............. 709/224

FOREIGN PATENT DOCUMENTS

JP 2000278265 A * 10/2000

OTHER PUBLICATIONS

Kurose, James F. and Keith W. Ross. "Computer Networking: A Top-Down Approach Featuring the Internet." 2001 Addison Wesly Longman, Inc. pp. 167-172.*

Stevens, W. "TCP/IP Illustrated, vol. 1: The Protocols." 1994 Addison Wesley. pp. 1-3.*

UCB/LBNL/VINT Network Simulator -ns (version 2) Information Sciences Institute. Aug. 2000. http://web.archive.org/web/20000819030658/http://www.isi.edu/nsnam/ns/.*

Li, Hongqing et al., "A Simulation Study of TCP Performance in ATM Netowrks with ABR and UBR Services." 1996 IEEE.*

Nichols, Kathleen M. "Improving Network Simulation with Feedback." 1998 IEEE.*

Book: Communication Networks Fundamentals Concepts and Key Architectures by Leon-Garcia and Indra Widjaja. ISBN 0-07-242349-8, Cover page and pp. 575-577, 57-63; Publication Year 2000.*

TCP/IP model < http://en.wikipedia.org/wiki/TCP/IP_model> Aug. 2007.*

* cited by examiner

MODELLING AGGREGATE TRANSPORT LAYER NETWORK TRAFFIC BEHAVIOUR WITH FEEDBACK CONTAINING PACKET LOSS INFORMATION

BACKGROUND

This invention relates to modelling network traffic behaviour on a communications network and particularly to a method of modelling network behaviour by generating instructions for altering network traffic transmission rate, based on feedback data.

Modelling network traffic is useful for simulating the performance of a network under test. The technology that is used in networks and communications develops rapidly and constantly and new communications methods and devices must be thoroughly tested before they are made available for public use. Such testing should occur under conditions which are as realistic as possible in order to ratify network performance and ensure that erroneous or fatal transmissions do not occur.

As the capabilities of new network devices and transmission protocols grow, so do the requirements of systems which are used to test them. Devices that are used in communications networks are many and varied and include gateways, bridges, routers, switches, repeaters and multiplexers.

The Internet and other communications networks have evolved to facilitate web-based applications, pervasive videoconferencing and video streaming services, and virtual networked environments. Other networks such as telephone, radio and television are also being used in combination with the Internet. As a result, the spectrum of communications network users and their needs has become increasingly diverse. As the number of people using these communications networks increases, so do the loads that are transmitted. This results in increased demand for faster and more efficient data transmission devices and protocols. The networks themselves must also be extended.

Accordingly, techniques for testing communications networks, protocols and devices are useful to network administrators and service providers for verifying the performance and reliability of systems.

Known systems commonly use stateless packet traffic to test the performance of networks and devices. This typically involves sending data segments at the Network Layer using a connectionless protocol such as UDP. UDP is a connectionless transmission protocol that does not autonomously re-transmit packets if they are lost in the network. A limitation of this method is that modelled UDP traffic is not typical of traffic on networks such as the Internet. It is estimated that only 5-10% of the traffic which exists on the Internet utilises UDP, with the remaining 90-95% utilizing Transmission Control Protocol (TCP).

Further, UDP uses a predefined bandwidth and does not dynamically regulate the rate of transmission of individual dataflows in response to congestion. Accordingly, UDP does not adequately simulate behaviour that is typical of the majority of packet switching communications networks that are currently in use. Therefore, existing systems that use UDP to simulate network packet traffic simulate only a subset of real network traffic, preventing developers from being able to predict and/or determine the actual performance of the devices and/or network under test.

TCP is a connection oriented protocol that has in-built controls to ensure delivery. The in-built controls of TCP enable it to adjust its packet send rate in response to congestion. Some technology exists that attempts to use session oriented packet traffic to test networks and devices. These testing platforms produce traffic that is more typical of traffic that is present on the Internet. However, as the volume of packet traffic increases, testing platforms that generate session oriented packet traffic become saturated. Therefore these systems are limited in their scalability making session oriented packet traffic inappropriate for testing networks such as Internet backbone and other transmission links that have high traffic transmission capacities.

SUMMARY

According to a first embodiment of the invention, a method of modelling network traffic behaviour comprises transmitting network traffic through a communications network at a transmission rate and receiving the network traffic from the communications network at a traffic receiver. Feedback data is derived from the received network traffic and used to generate instructions for altering the network traffic transmission rate. Network traffic is then transmitted through the network at the altered transmission rate in accordance with the instructions.

According to a second embodiment of the present invention, a system models network traffic behaviour on a communications network. The system comprises a generator generating network traffic at a transmission rate, in response to instructions received and a traffic receiver that receives network traffic and derives feedback data from the network traffic. The system further comprises a computer processor generating instructions for altering the network traffic transmission rate. The computer processor uses the feedback data to generate the instructions.

According to a third embodiment of the present invention, a computer program product resides on a programmable medium conveying a programmed method for modelling network traffic behaviour on a communications network. The programmed method comprises programmably receiving feedback data and generating instructions for altering a network traffic transmission rate. The instructions are derived at least in part from the feedback data. The method further includes altering the network traffic transmission rate in accordance with the instructions. The feedback data is derived from network traffic which is received at a traffic receiver.

DETAILED DESCRIPTION

Figure 1:
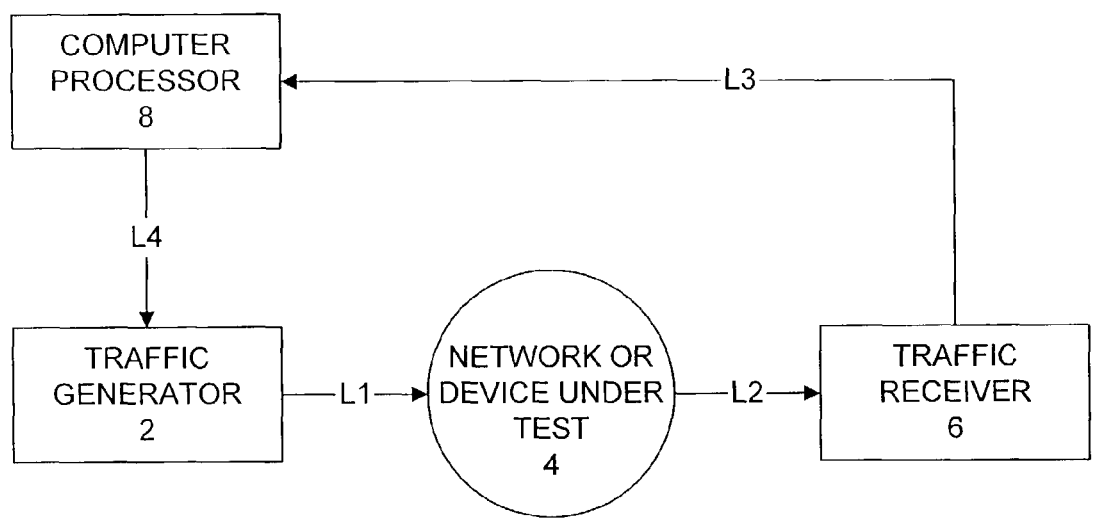
FIG. 1 is a block diagram which illustrates an embodiment of the invention.

Referring firstly to the block diagram of FIG. 1, a method constructed according to a first embodiment of the invention transmits network traffic from traffic generator 2 through network 4 at a transmission rate. The network traffic is received from network 4 at traffic receiver 6 and feedback data is derived from the network traffic received by traffic receiver 6. The feedback data is used to generate instructions for altering the network traffic transmission rate and the network traffic is transmitted through network 4 at the altered transmission rate according to the instructions. Typically, the network 4 is a communication network, a network device, any other communication device and any aspect or aspects of a communication system for which network traffic behaviour can be modelled.

In this embodiment, network traffic generated by traffic generator 2 is placed on transmission link L1 and is directed through network 4. Outgoing transmission link L2 carries network traffic to traffic receiver 6. Network 4 includes a unit under test such as a router that redirects Transport Layer traffic. Alternatively, the communications network itself may be under test. Traffic receiver 6 extracts information contained in the payload of the network traffic originally sent from traffic generator 2. This information is used to produce feedback data subsequently sent on transmission link L3 and arriving at computer processor 8. The information may include the order in which subsequent packets are sent and other management and proprietary data. Therefore, the network traffic is specifically created for use in testing the network, with this useful data contained in the payload of each packet rather than consuming valuable overhead.

Computer processor 8 is programmed with one or more algorithms, or "simulation profiles" and executes the algorithms that use the feedback data to generate periodic regulation instructions for altering the rate at which network traffic is transmitted by traffic generator 2. These instructions are communicated on transmission link L4 to traffic generator 2. The instructions may also relate to other network performance parameters in addition to transmission rate. Although transmission link L4 is labelled as a "network connection", it includes reference to the internal connections of any device capable of performing the functions of both computer processor 8 and traffic generator 2.

Typically, the feedback data relates to the network traffic transmission rate, and provides information concerning numbers of packets lost. However, the feedback data may relate to network latency or any other appropriate network characteristic. The feedback data is preferably derived from information stored in the payload of packets sent from traffic generator 2 and received at traffic receiver 6. Such information typically includes the order in which packets of network traffic are sent. Therefore, the traffic receiver is able to determine if packets have been lost. Alternatively or additionally, information in the payload may relate to the time at which the packets were sent. In such an embodiment, traffic generator 2 and traffic receiver 6 are typically synchronized so that traffic receiver 6 is able to generate feedback data relating to network latency.

Typically, the inventive method simulates aggregate TCP/IP traffic for the Network Layer. Accordingly, the feedback data on transmission link L3 is data which pertains to the TCP/IP packets that have not arrived in the expected order or that have not arrived at all at traffic receiver 6 during finite, regular time intervals.

It is to be noted that previous methods used to simulate network behaviour have relied on the in-built flow control characteristics of Layer 3 of the OSI Reference Model. However, the present invention does not emulate flow control in the transmission of network packets by including sequence numbers in the header information of those packets. Rather, it relies on data that is built into the payload of the packets transmitted. This data is fed back to computer processor 8 and used to monitor the performance of network 4.

A system constructed according to a second embodiment of the invention models network traffic behaviour on a communication network and includes traffic generator 2 for generating network traffic at a transmission rate that is determined in response to instructions it receives. It also includes traffic receiver 6 for receiving network traffic from which it derives feedback data and computer processor 8 for generating instructions for altering the network traffic transmission rate. The instructions are generated using the feedback data.

Computer processor 8 executes a regulator algorithm to formulate decisions about transmission rate and to determine instructions that are sent to traffic generator 2 via transmission link L4. If feedback data on L3 indicates that packets have been lost, then there is probably congestion on the network. Therefore, the instructions for adjustment of transmission rate will be based on the rate of packet loss. Other factors may also be considered to determine the change in transmission rate. The overall effect of the system is to generate network traffic at a transmission rate that simulates an aggregate of individual TCP/IP sessions on an actual network.

Figure 2:
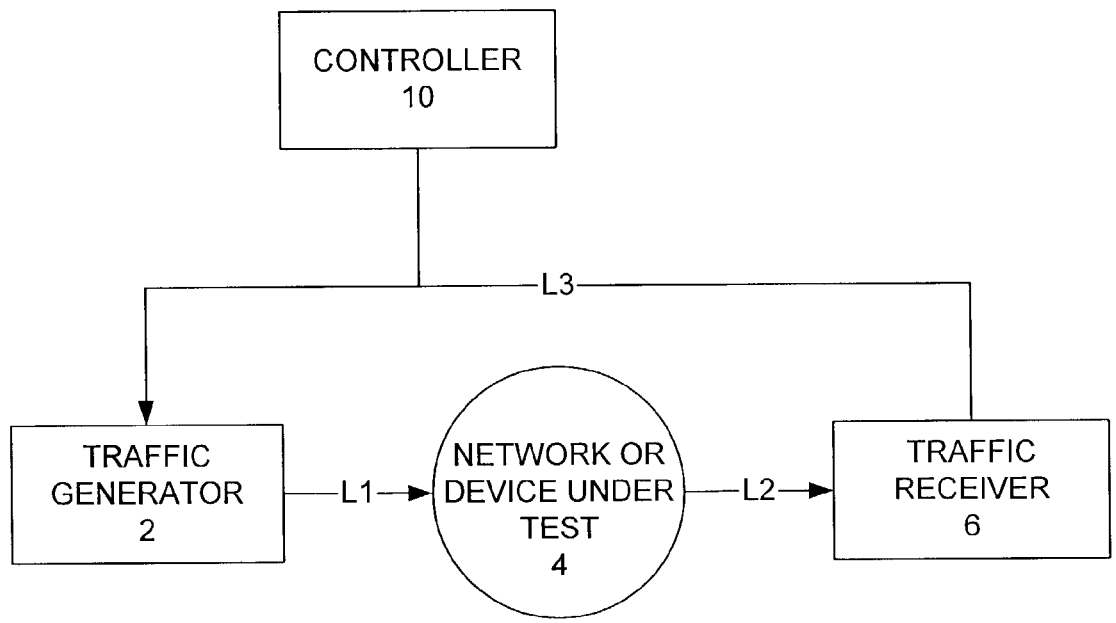
FIG. 2 is a block diagram which illustrates an embodiment of the invention where feedback data is sent to the traffic generator "out of band".

FIG. 2 shows an alternative to the embodiment of FIG. 1 with computer processor 8 incorporated into traffic generator 2. Traffic generated by traffic generator 2 is transmitted to network or device under test 4 via incoming transmission link L1 and is forwarded to traffic receiver 6 via outgoing transmission link L4. Feedback data is then generated by traffic receiver 6 and placed on connection L3 which is reserved for non-network traffic transmissions. That is, the feedback data is transmitted from traffic receiver 6 to traffic generator 2 "out of band".

When the feedback data is transmitted to computer processor 8 (incorporated into traffic generator 2) "out of band" via link L3, independent of network links or connections used to transmit network traffic, it is preferred that the link is dedicated to transmitting the feedback data. However, it may also be used to carry data for other purposes. This embodiment is particularly useful for research and development of new network devices and protocols in isolation where it is feasible to employ an additional link that is dedicated to carrying the feedback data. An appropriate isolated environment would be a testing laboratory where an independent physical connection between the traffic receiver 6 and the computer processor 8 or any other devices on the network under test can be installed easily. However, in environments where the device under test is located on an existing network such as the Internet, or when a new transmission protocol is being tested over an existing network, this is not generally possible.

It is to be understood that more than one traffic generator 2 can be implemented in the test system. Accordingly, in an embodiment where multiple traffic generators 2 are included, each individual traffic generator may be configured to generate traffic with specific characteristics and behaviours. Similarly, the traffic generated by traffic generator(s) 2 may be distributed to and associated with one or more traffic receivers 6. When multiple traffic receivers 6 are employed, the feedback data from the traffic receivers is aggregated and used as input for the generation of instructions for changing the rate of traffic transmission.

Figure 3:
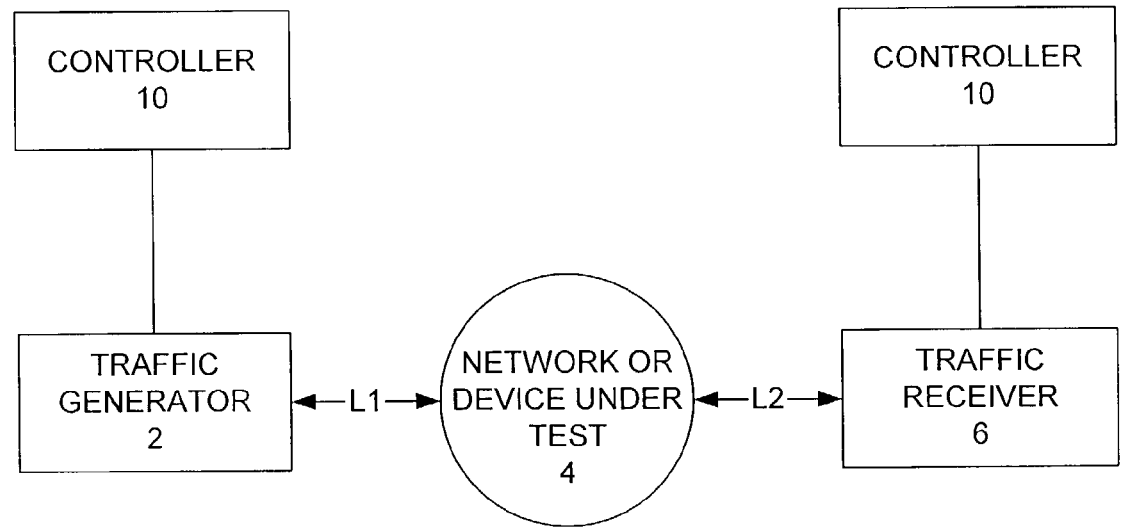
FIG. 3 is a block diagram which illustrates an embodiment of the invention where feedback data is sent to the traffic generator "in-band".

In an alternative embodiment, the feedback data is transmitted to computer processor 8 "in-band", or using existing transmission links that are also used to transmit network traffic and other data packets. This is particularly useful where a large physical distance separates traffic generator 2 and traffic receiver 6. The network may also include one or more devices that are under test such as network routers and repeaters. FIG. 3 illustrates an embodiment that is preferable for use where traffic generator 2 and traffic receiver 6 are separated by a large physical distance.

In such an arrangement, it is inconvenient and may not be possible to provide a dedicated transmission link to carry feedback data as provided in the embodiment illustrated in FIG. 2. Accordingly, in the example shown in FIG. 3, the feedback data is transmitted "in-band", transparently through network 4. That is, the feedback data is sent to computer processor 8 on existing links such as L1 and L2. These links L1 and L2 may also used to send network traffic over the communications network from traffic generator 2 to traffic receiver 6.

"In-band" transmission of feedback data from traffic receiver 6 to computer processor 8 may not be perfect as the feedback data will be subject to the same network congestion as the network traffic "packets". This can be overcome or at least minimized by setting the feedback data's transmission quality of service (QoS) requirement to the highest priority. However, unlike the embodiment of FIG. 2, perfect feedback data transmission is still not guaranteed. Further, in the embodiment illustrated in FIG. 3, separate test controllers 10 are required at both traffic receiver 6 and traffic generator 2 to configure and manage the connection of these devices. In contrast, in the embodiment illustrated in FIG. 2, controller 10 can be used to control both traffic generator 2 and traffic receiver 6. It is to be noted that the controllers 10 do not form part of the inventive concept, but are mentioned for completeness.

The computer processor 8 executes one or more pre-programmed algorithms to generate the instructions for altering the network traffic transmission rate. Each algorithm may correspond to a "simulation profile" built to exhibit network traffic characteristics typical of various types of communications networks and operational conditions. Typically the algorithms are stored in a set and can be changed, added to and deleted from as required providing scope for varying and updating the simulation profiles available during testing. Accordingly, it is preferred that the computer processor is configured to receive input to vary the algorithms. By way of example, the input may relate to network congestion and/or network latency.

Similarly, it is preferred that the computer program product of the present invention is configured to receive additional input that may be used with the feedback data during execution of the method for generating of instructions for altering the network traffic transmission rate. Such input may relate to one or more network characteristics such as congestion or latency.

The network traffic may be generated for transmission in any layer of the Open Systems Interconnection (OSI) reference model. Typically, this network traffic is Transport Layer traffic or Network Layer traffic that contains "dummy data" representative of data at the Transport Layer. In real networks using a connection-oriented protocol such as TCP, if a packet is not received it is re-transmitted. This has the effect of slowing the rate with which information can be sent over the network, since re-transmission of packets that were not received originally consumes a portion of the available bandwidth.

Typically, network traffic is generated so that proprietary data or data relating to the network traffic sent from traffic generator 2 to the traffic receiver 6 is included in the payload of packets of network traffic data. This proprietary data may include the order in which the packets were sent and/or the time at which each packet was sent and/or other management data. That is, the network traffic typically includes "receipted" data packets that enable identification of packets that have been sent but not received so they can be re-transmitted. In such an embodiment, the altered transmission rate simulates an effect on the network that results from re-transmission of packets that have not been received. The feedback data may also contain other management data.

The data included in the payload of the network traffic is then interpreted at traffic receiver 6 and conveyed to computer processor 8 in the form of feedback data. Accordingly, the feedback data may be generated specifically for use by the present invention to generate instructions for altering the transmission rate of the network traffic.

Computer processor 8 may be a stand-alone computer. Alternatively, computer processor 8 may be part of the traffic generator 2 or traffic receiver 6. In one embodiment, the system is portable and useful for modelling the behaviour of a communications network in different physical locations. The rate at which traffic generator 2 transmits traffic can then be altered according to instructions generated by computer processor 8. The network under test may include one or more network routers, switches, repeaters, encryption devices or any other network device.

Preferably, the feedback data is generated by traffic receiver 6 and is configured to be programmably read by computer processor 8, which uses the feedback data to generate instructions for altering the network traffic transmission rate.

Advantageously, modelling network traffic behaviour in according to the present invention requires significantly less processing power than existing modelling systems. This is because the present invention simulates an aggregate of sessions (or an aggregate of transport layer flows), modelled on actual traffic transmission rates rather than simulating the actual traffic flows or sessions themselves. This enables users to test more complex networks and transmission protocols, and expands the breadth of transmission platforms that can be tested.

The present invention can also be used to test the ability of a network and/or device(s) to meet the standards of service level agreements with which they are offered. In such applications, the present invention can be used to flood a network with an aggregate of network traffic flows, model the packet loss, and adjust the rate of transmission. The transmission rate adjustment should reflect the level of service which has been agreed upon (i.e. "gold" level service maintains faster transmission rate than "silver" and "bronze").

While the embodiments of the present invention have been illustrated in detail, it should be apparent that modifications and adaptations to these embodiments may occur to one skilled in the art without departing from the scope of the present invention as set forth in the following claims.

What is claimed is:

1. A method of modelling network traffic behaviour comprising:
   (a) transmitting network traffic that simulates an aggregate of transport layer flows or sessions rather than simulating individual transport layer flows or sessions through a communications network at a transmission rate, said network traffic including packets of data, each packet comprising a header and a payload, said transmitting of said packet depending on said header of that packet and not on said payload of that packet;
   (b) receiving at a traffic receiver the network traffic from the communications network;
   (c) deriving feedback data from the payload of the network traffic data packets received by the traffic receiver;
   (d) transmitting the feedback data to a computer processor;
   (e) generating, using the feedback data, instructions for altering the network traffic transmission rate; and
   (f) transmitting network traffic through the network at the altered transmission rate according to the instructions,
   wherein the feedback data includes packet loss information regarding the network traffic and wherein generating instructions for altering the network traffic transmission rate includes generating instructions for altering the transmission rate based on a rate of packet loss.

2. A method of modelling network traffic behaviour according to claim 1 wherein the network traffic behaviour is characteristic of connection-oriented traffic.

3. A method of modelling network traffic behaviour according to claim 1 wherein the network traffic behaviour is characteristic of Transport Layer traffic.

4. A method of modelling network traffic behaviour according to claim 1 wherein the network traffic includes receipted data packets, and the altered transmission rate simulates congestion resulting from re-transmission of packets which have not been received, wherein said receipted data packets comprise data packets whose payload comprises data specifying the order in which said packets were sent or the time at which each packet was sent.

5. A method of modelling network traffic behaviour according to claim 4 wherein the receipted data packets are transmission control protocol (TCP) packets at the Transport Layer and Internet protocol (IP) packets at the Network Layer.

6. A method of modelling network traffic behaviour according to claim 1 wherein the instructions are generated by the computer processor and the feedback data is transmitted to the computer processor using one or more transmission links also used to transmit network traffic on the communications network.

7. A method of modelling network traffic behaviour according to claim 6 wherein the computer processor generates the instructions using one or more pre-programmed algorithms.

8. A method of modelling network traffic behaviour according to claim 6 wherein the instructions are changed in response to input provided to the computer processor; wherein the input comprises the feedback data and additional data unrelated to the feedback data.

9. A method of modelling network traffic behaviour according to claim 8 wherein the input relates to network traffic characteristics including network latency.

10. A system for modelling network traffic behaviour on a communications network comprising:
    (a) a generator generating network traffic at a transmission rate in response to instructions received, said network traffic simulating an aggregate of transport layer flows or sessions rather than simulating individual flows or sessions, said network traffic including packets of data, each packet comprising a header and a payload, said transmission of said packet depending on said header of that packet and not on said payload of that packet;
    (b) a traffic receiver receiving network traffic and deriving feedback data from the payload of the network traffic data packets; and
    (c) a computer processor generating instructions for altering the network traffic transmission rate, using the feedback data,
    wherein the feedback data includes packet loss information regarding the network traffic and wherein generating instructions for altering the network traffic transmission rate includes generating instructions for altering the transmission rate based on a rate of packet loss.

11. A system for modelling network traffic behaviour according to claim 10 wherein the network traffic behaviour is characteristic of connection-oriented traffic.

12. A system for modelling network traffic behaviour according to claim 10 wherein the network traffic behaviour is characteristic of Transport Layer traffic.

13. A system for modelling network traffic behaviour according to claim 10 wherein the feedback data is transmitted to the computer processor using one or more transmission links that also transmit network traffic on the network.

14. A system for modelling network traffic behaviour according to claim 10 wherein the network traffic includes receipted data packets, and the altered transmission rate simulates congestion resulting from re-transmission of packets which have not been received, wherein said receipted data packets comprise data packets whose payload comprises data specifying the order in which said packets were sent or the time at which each packet was sent.

15. A system for modelling network traffic behaviour according to claim 14 wherein the receipted data packets are transmission control protocol (TCP) packets.

16. A computer program product comprising a computer readable medium having instructions loaded thereon, said instructions when loaded into a computer causing said computer to perform a programmed method for modelling network traffic behaviour on a communications network, the programmed method comprising:
    (a) receiving feedback data derived from payloads of data packets of network traffic received by a traffic receiver, each data packet comprising a header and a payload, said receiving of said packet depending on said header of that packet and not on said payload of that packet, wherein the network traffic simulates an aggregate for transport layer flows or sessions rather than simulating individual flows or sessions;
    (b) generating instructions, derived at least in part from the feedback data, for altering a network traffic transmission rate; and
    (c) causing the network traffic transmission rate to be altered in accordance with the instructions,
    wherein the feedback data includes packet loss information regarding the network traffic and wherein generating instructions altering the network traffic transmission rate includes generating instructions for altering the transmission rate based on a rate of packet loss.

17. A computer program product according to claim 16 wherein the network traffic behaviour is characteristic of connection-oriented traffic.

18. A computer program product according to claim 17 wherein the network traffic includes receipted data packets and the altered transmission rate simulates network congestion resulting from re-transmission of packets which have not been received, wherein said receipted data packets comprise data packets whose payload comprises data specifying the order in which said packets were sent or the time at which each packet was sent.

19. A computer program product according to claim 18 wherein the receipted data packets are transmission control protocol (TCP) packets.

20. A computer program product according to claim 16 wherein the network traffic behaviour is characteristic of Transport Layer network traffic.

21. A computer program product according to claim 16 wherein the computer program product is used by a computer processor receiving the feedback data via one or more transmission links and is also used to transmit network traffic on the network.

22. A computer program product according to claim 16 wherein the programmed method further comprises programmably receiving input used to generate the instructions, wherein the input comprises the feedback data and additional data unrelated to the feedback data.

23. A computer program product according to claim 22 wherein the input relates to network traffic characteristics including network latency.

* * * * *